United States Patent [19]

Keil

[11] Patent Number: 4,899,865
[45] Date of Patent: Feb. 13, 1990

[54] PRODUCTION LINE ARRANGEMENT WITH SELECTABLE TRANSPORT PATHS

[75] Inventor: Bernd Keil, Reinach, Switzerland

[73] Assignee: Mat Menziken Automation AG, Menziken, Switzerland

[21] Appl. No.: 271,939

[22] Filed: Nov. 15, 1988

[30] Foreign Application Priority Data

Nov. 20, 1987 [CH] Switzerland .................. 4522/87

[51] Int. Cl.[4] ............................................. B65G 37/00
[52] U.S. Cl. .................................. 198/351; 198/465.1; 209/656
[58] Field of Search .................. 198/465.1, 465.2, 348, 198/351, 367, 353, 354, 355; 209/656

[56] References Cited

U.S. PATENT DOCUMENTS

| 1,939,891 | 12/1933 | Glahn et al. | 198/354 |
| 3,595,374 | 7/1971 | Whitfield | 198/367 |
| 3,622,043 | 11/1971 | Chotard | 198/465.1 X |
| 3,822,646 | 7/1974 | Rosenberger, Jr. | 198/354 X |
| 4,681,231 | 7/1987 | Veda et al. | 198/354 X |
| 4,694,949 | 9/1987 | Nakagawa | 198/465.1 X |
| 4,736,830 | 4/1988 | Hofmann | |

FOREIGN PATENT DOCUMENTS 0636147 12/1978 U.S.S.R. .................. 198/465.2

Primary Examiner—Robert J. Spar
Assistant Examiner—James R. Bidwell
Attorney, Agent, or Firm—Frishauf, Holtz, Goodman & Woodward

[57] ABSTRACT

To provide for diversion of transport plates (3) being transported in a main transport path (3) to a diversion path (6) extending, for example, at right angles to the main transport path and having transport belts (7) extending along the diversion path, while rotating workpieces (2) on the workpiece carrier plates (3) so that they will always face the same direction with respect to the transport or diversion path, for example at the outside of a rectangular production line-and-bypass arrangement (FIG. 1), deflection plates (10) are formed with a groove (12) at the bottom thereof, having a straight run-on and run-off portion and a quarter-circular portion, for engagement with guide rollers (18) positioned on pins (13) and secured to the transport plates (3) so that, upon frictional engagement of the transport plates with the belts running underneath the main transport path and the bypass path (6), the plates will be deflected and rotated at the same time. To selectively switch the plates, or not, the deflections plates can be secured to a lifting device (20), for selective disengagement or engagement of the rollers (18) in the groove (12) of the deflection plate. By placing rollers at two parallel edges of the deflection plate, the deflection plates can be, selectively, deflected towards the right or the left, in selected secondary transport paths.

21 Claims, 3 Drawing Sheets

PRODUCTION LINE ARRANGEMENT WITH SELECTABLE TRANSPORT PATHS

Reference to related patent, the disclosure of which is hereby incorporated by reference: U.S. Pat. No. 4,736,830, Hofmann.

The present invention relates to handling workpieces which are located on or secured to workpiece carrier plates, and to transport the workpiece carrier plates and workpieces along a predetermined production line path, and an arrangement to, selectively, switch the workpiece carrier plates with the workpieces, to branching paths, while handling the plates and workpieces thereon gently.

BACKGROUND

Various types of production line systems and arrangements utilize transport plates on which workpieces, or structures requiring assembling or working thereon, are secured to transport plates. The transport plates are guided along the production line and moved, for example, by a continuously moving belt. At respective work stations, the carrier plates are stopped so that operations can be carried out on the workpieces, for example by associating other parts therewith, assembly, or the like. Typically, the feed of the plates is obtained by frictional engagement with the moving transport belts or webs. The plates can lie loosely on the transport belts. A typical arrangement of this type, including an arrangement to stop continued movement of the carrier plates at the respective work stations, is shown in the referenced U.S. Pat. No. 4,736,830, Hofmann, the disclosure of which is hereby incorporated by reference.

Work being carried out at the respective work stations may require different operating times at different stations. To permit operations to be carried out which are independent of a certain cadence or clock rate, and to store carrier plates, it is frequently desirable to have a longitudinal transport path and, in addition thereto, branching transport paths along which carrier plates can be branched. The branching path may terminate in a second transport line or transport path, parallel to the first one from which the branching path extends. Typically, the branching path is a cross connection between two elongated transport paths, extending at approximately right angles to the elongated transport path. The branching path thus can form a bypass. Additional bypasses can be constructed so that the overall transport system may, for example, in top view, be essentially rectangular. The carrier plates, moving along the first longitudinal path, are stopped by a stopper. They can be accepted by the cross connection branching path in the same relative position in which they were stopped. At the end of the cross connection path, a further stop is provided and, upon acceptance of the carrier plate by a second longitudinally moving belt, the transport plate is again moved in the same preceding relative position along the second transport path. The second transport path, if it extends parallel to the first, will then move the carrier plate, and with it the workpiece, in 180° relative rotation with respect to the outside of the second transport path so that, if the diversion across the branch was done to permit additional personnel to operate along the second transport line, they face the workpiece backwardly, so that the entire carrier plate as well as the workpiece must be rotated by 180° for work thereon. Thus, if it is desired to work additionally on the workpieces along the second or bypass production line, it is frequently necessary to rotate the transport plate, and with it the workpieces, by 180° about a vertical axis—with respect to the transport path.

THE INVENTION

It is an object to provide a production line arrangement, in which carrier plates are transported along a transport path and, selectively, can be diverted along a diversion path which extends essentially at right angles to the transport path, and in which the carrier plates and hence the workpieces thereon, are reoriented so that a given side of the carrier plates, and of the workpieces, will always have the same relative orientation with respect to the transport path and the diversion path, for example always facing the right side, with respect to the movement of the workpieces, along the respective paths.

Briefly, at least one deflection plate is located at an intersection of the transport path and the diversion path, which transport plate and deflection plate are arranged with cooperating interengaging, interfitting guide means to swing the transport plate about a vertical axis. Typically, the interengaging, interfitting guide means are cooperating projection-and-recess means, for example in the form of an arcuate groove, at the lower side of the deflection plate which is engaged by upstanding pins, which may have rollers thereon, on the carrier plate. As the carrier plate is thus moved along one longitudinal path, and, when the upstanding pins and/or rollers engage the groove of the deflection plate, the carrier plate will be moved along the arcuate path, to then be frictionally engaged by a transport belt on the diversion path. A rectangular arrangement can be easily constructed by placing a second deflection plate at the end of the diversion path, and at an intersection with a second production line, the second deflection plate then, in cooperation with a transport belt system on the second production line, swinging the carrier plate and the workpiece thereon about 90°. The arrangement, thus, can be either rectangular or U-shaped.

The arrangement has the advantage that the workpiece will always face towards the same side relative to the production line, that is, for example always the outside thereof, while requiring only an especially simple arrangement to swing or shift the transport plates about a vertical axis. No additional rotary drive for rotation of the carrier plates is necessary; existing production arrangements which use carrier plates, can readily be modified. The system is reliable, essentially maintenance-free, and simple to install. Additionally, the system is easily controllable so that, with minimum apparatus, the carrier plates can proceed along the production line path or be guided to a bypass.

DRAWINGS

ILLUSTRATING AN EXAMPLE:

DETAILED DESCRIPTION

Figure 1:
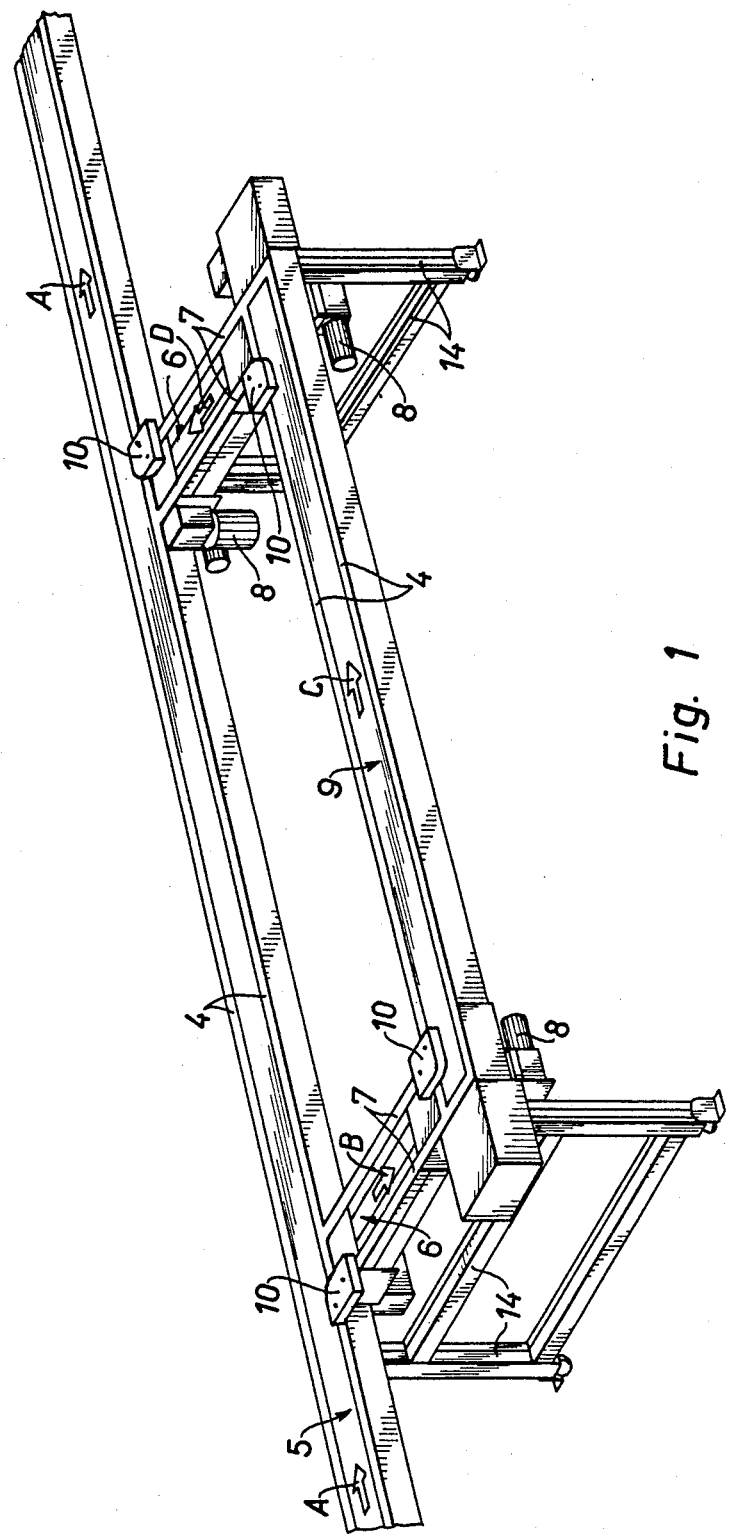
FIG. 1 is a perspective view of a portion of a production line arrangement, in a rectangular orientation, and constructed in accordance with the present invention.

Workpieces 2 (FIG. 2) are moved along a transport path, for example in the direction of the arrows A (FIG. 1) of a production line between work stations, not shown, and located, for example, longitudinally along the production line path. A plurality of transport plates 3 (FIGS. 2, 3) are moved along the transport path, on which the workpieces 2 are retained. The transport plates 3, see FIG. 1, are moved along the production line path by two parallel horizontal belts 4. The belts 4 define two parallel production lines: a production line 5 which extends, for example, longitudinally along a factory floor and a line 9. If certain work stations require more time for working on the workpieces 2 than others, then such work stations can be located along a parallel production line 9 so that the overall flow of production is not impeded by the additional time taken for specific operations along line 5. The carrier plates 3 are guided in the respective production paths between vertical guide rails 11. The carrier plates 3 are seated loosely on the belts 4, which move continuously. The production lines 5, 9 are suitably supported on a frame 14, which may be of any customary construction.

To permit branching of carrier plates and workpieces thereon, while retaining the orientation of the workpieces with respect to, for example, the outside of the production lines 5 and 9, two spaced diversion or bypass transport paths 6 are provided, which, respectively, cooperate with the second parallel longitudinal transport path 9. Each one of the deviation paths 6 has two parallel, horizontal transport belts 7, extending at essentially right angles to the transport belts 4. The transport belts 4 and 7 are operated at essentially the same speed, driven by motors 8. Movement of the transport plates 3, starting from the left of FIG. 1, is first in the direction of the arrow A; then, selectively, continuing in the direction of the direction arrow A, or deviated, or bypassed in the direction of the arrow B on the bypass path towards the second longitudinal transport path 9, to be then moved in the direction of the arrow C to the second cross-connecting or bypass path 6, to be moved in the direction of the arrow D, and then returned to the main production line 5 for continued movement along the arrow A. Various arrangements of the respective production line path layouts are possible; other switches or deviations for the carrier plates 3 can be provided. For example, the transport plates or carrier plates 3 can be moved on the second longitudinal path in a direction opposite to that of the arrows A, that is, opposite the transport direction along the path 5. Such an arrangement is shown in FIG. 2, and may be suitable, for example, for rework of workpieces, or additional work on selected workpieces which, then, are to be returned to the first production line or path 5.

Figure 2:
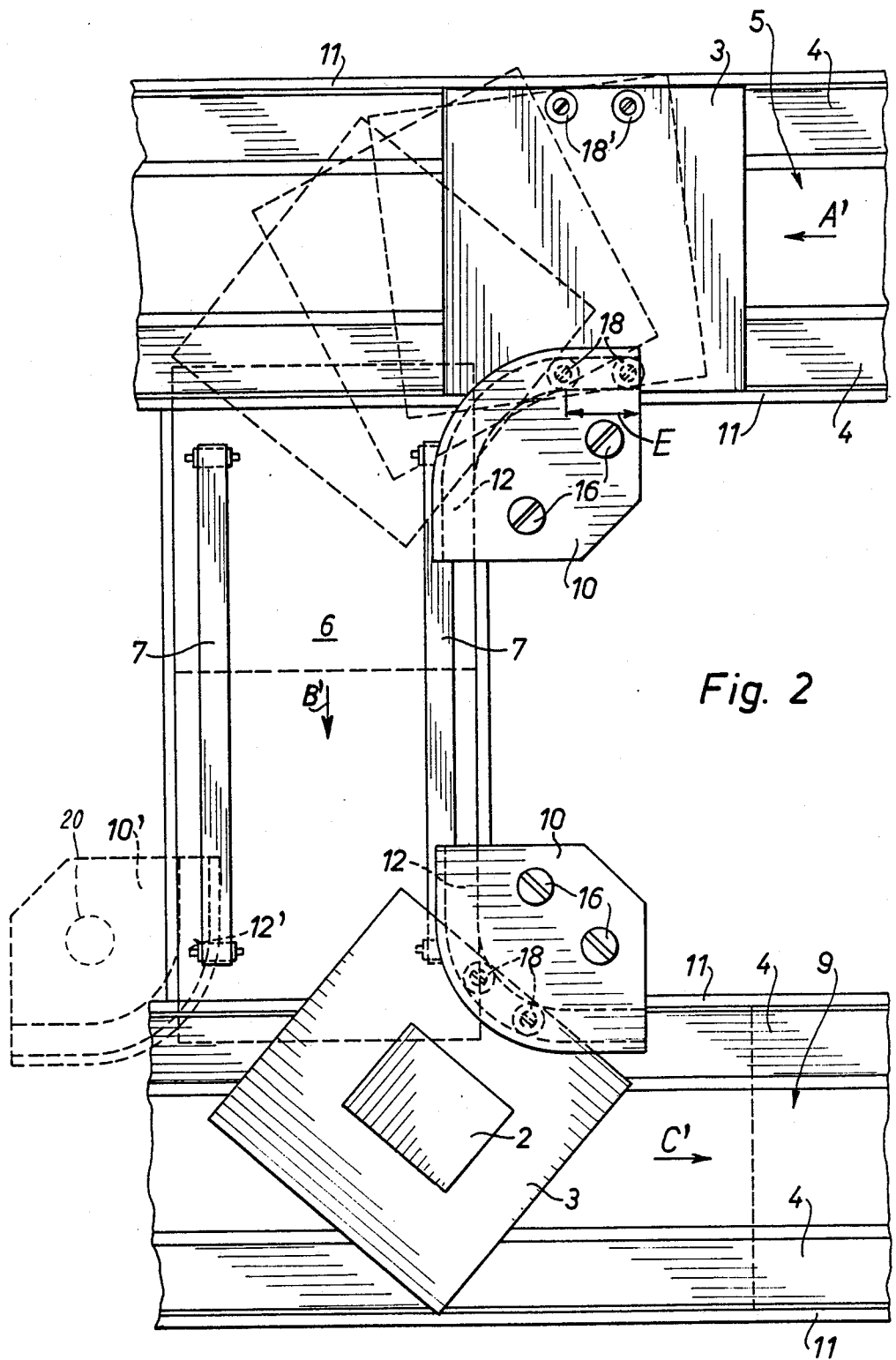
FIG. 2 is a top view, to a scale enlarged with respect to FIG. 1, and illustrating another production line arrangement, and showing details of the deflection plate.
Figure 3:
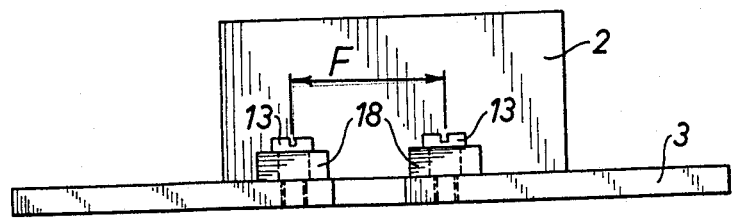
FIG. 3 is a schematic side view of a transport plate of standard construction, modified to be suitable for use in the present invention.

In accordance with the present invention, a deflection plate 10 is located at the junction or intersection of a first transport path, as shown in FIG. 2 of transport path 5, and of the bypass, or deviation path 6, the deflection plate 10 being formed with a quarter-circular projection-and-recess interengagement arrangement for selectively coupling with the transport plates 3. The deflection plates 10, as shown, have a groove 12 formed, preferably, at the lower surface. The groove 12 has a straight run-on and run-off portion, extending in the direction of the transport paths 5, 6, respectively. The deflection plates 10 can be securely connected to the frame 16, for example above the belts 4, 7 by screws 16. Plates 10 are located in a plane parallel to the plates 3.

Cooperating with the groove 12 in the deflection plate 10 are interengaging projections formed on the transport plates 3 on which the workpieces 2 are secured. The transport plates 3 are usually essentially square or rectangular plates, loosely and frictionally placed on the belts 4, 7, for transport by frictional engagement therewith. In accordance with a feature of the invention, each one of the transport plates 3 has a pair of upwardly projecting pins, preferably surrounded by rollers 18, located along at least one of the edges of the plate extending parallel to the transport direction A. The rollers 18 are located spaced from each other, symmetrically with respect to a central axis of the transport plate 3, and secured to the transport plate 3 by suitable screws 13, or the like (see FIG. 3). Rather than using rollers, fixed pins may be used. The straight run-on portion, as well as, preferably, also the straight run-off portion, of the groove 12 has a length E which is preferably at least the same or more than the length of the spacing F (see FIG. 3) of the centers between adjacent rollers 18 or corresponding pins. Preferably, the plates 3 have rollers 18 positioned along one of the lateral edges and a similar pair of rollers 18' (see FIG. 4) located along the opposite edge.

Figure 4:
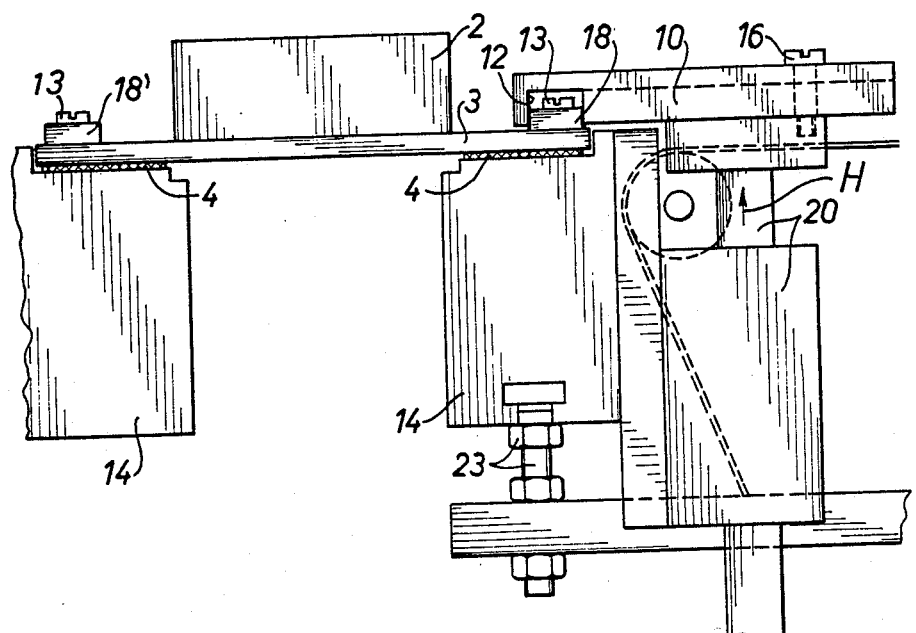
FIG. 4 is a schematic side view of a level adjustment for the deflection plate to permit selective movement of carrier plates in a bypass, or not.

Selective deflection of the carrier plates 3 can be obtained by positioning the deflection plates 10 so that their level with respect to the rollers 18 can be adjusted. This adjustment can be obtained mechanically and automatically. FIG. 4 illustrates an arrangement in which the deflection plates 10 are secured by the scews 16 not to the frame 14 of the production line but, rather, to a level adjustment lifting mechanism 20. The lifting mechanism 20 is secured to the frame 14 for example via a holding bracket and adjustment screws 23. Upon operation of the lifting device 20, the deflection plate 10 is vertically moved in accordance with the arrow H (FIG. 4). The lifting distance or stroke of the lifting device 20 is longer than the engagement depth of the rollers 18 in the groove 12 of the deflection plate 10. When lifting the deflection plate 10, the deflection effect of the plate 10 is inhibited, and the respective transport plate will continue its transport path in the same direction as commanded by the belts 4 on which it is engaged. Thus, by a simple lifting apparatus, the direction of movement of the deflection plates can be controlled, and the deflection arrangement can be selectively engaged or disengaged for coupling with selected transport plates.

OPERATION, WITH REFERENCE TO FIGS. 2 AND 4:

Let it be assumed that plates 3 are moved along a main transport path by the belts 4 in the direction of the arrow A'. When they reach a junction or intersection with respect to the cross or bypass path 6, they will reach the region of the deflection plate 10. The rollers 18 will engage in the groove 12, where they are loosely guided. The groove 12, besides the straight run-on and run-off portions, has an arcuate portion. Some clearance between the rollers 18 and the groove 12 permit rotation of the transport plates 3, as shown by sequential broken-line positions of the plates 3. The deflection rollers 18, loosely guided in the groove 12, thus rotate the plate 3 in a quarter-circular path. The transport belts 4 and 7, which are continuously moved, provide vectorial components of drive to form a combined, superimposed drive for the transport plate 3. Some slippage will occur between the transport plate 3 and the longitudinal belts 4 as well as the transport plate and the cross belts 7. The rollers 18, guided in the groove 12 with lateral play, effect rotation of the transport plate 3 by 90°. The transport plate 3 will then be positioned to be further transported in the direction of the arrow B' by the belts 7.

When the plate 3 has reached the end of the cross-connecting path, the same engagement-rotation and continued transport in the direction of the arrow C', will occur as previously described with respect to the change of direction from arrow A' to arrow B' of the plates 3. A further deflection plate 10 acts on the transport plate 3 and moves the transport plate 3 to the second transport path 9, extending parallel to the transport path 5, for movement in the direction of the arrow C'.

In a rectangular production line construction, the same rotation, bypass or cross-transport will obtain at the end of the transport path 9, for deflection across a further cross path 6 and, as above described, further deflection on the first longitudinal path 5.

The transport plate 3 can be rotated in either direction as shown by the broken-line plate 10', which is located, with respect to FIG. 2, at the left side of the cross-connecting or bypass path 6. The broken-line plate 10', for example, will move the plate 3 in the opposite direction, requiring, of course, change in the direction of movement of the belts 4 in the opposite direction, or another belt system. If the plates 10, 10' at the lower part of FIG. 2 are located on a selectively operable lifting apparatus 20 (FIG. 4), the plates can be guided, selectively, either to the right or to the left, with respect to FIG. 2, after having passed through the bypass path 6.

Connecting the deflection plates 10 with the lifting apparatus 20 (FIG. 4) permits selective deflection of the transport plates 3 on the cross path 6. The lifting apparatus or device 20 can be in accordance with any well known construction, and can be operated by fluid pressure, for example pneumatically or hydraulically, can be electrically operated using solenoids or the like, or by cams. When lifted, the respective deflection plate 10 does not engage the rollers 18 in the groove 12, so that the transport plate 3 will continue in the straight path which it previously had.

The belts 4, 7 need not extend the full length of the path. Since the system is arranged for a plurality of plates 3, some plates 3 which may not be engaged by a belt section of the belts 4 or 7, will be pushed along by subsequent plates 3 which still are engaged with the respective belts.

Various arrangements of the production paths may be used. For example, if only a single deflection plate 10 is located between the first transport path 4 (FIG. 1) and the cross or bypass path 6, and no deflection plate 10, or a lifted deflection plate 10 at the terminal end of the bypass path 6 at the intersection with the transport path 9, the carrier plate 3 will be rotated only by 90°, and will appear on the second transport path 9, with respect to the first transport path 4, by 90°; this may be desirable for selected working on the workpieces 2 and permits reorientation of the workpieces with respect to operating or work stations.

Various changes and modifications may be made within the scope of the inventive concept.

I claim:
1. Production line arrangement for transporting transport plates (3) adapted for holding workpieces (2) along a transport path (5) and, selectively, along a diversion path (6) extending at an angle with respect to said transport path, having
    transport belt means (4, 7) positioned along both the transport path and the diversion path for frictional engagement with the transport plates,
and comprising
    at least one deflection plate (10) located at an intersection of the transport path (5) and the diversion path (6),
    wherein said transport plates define at least one lateral edge extending in the direction of said transport path (5); and
    wherein at least some of the transport plates (3) and the deflection plate (10) are formed with interengaging interfitting guide means comprising a groove (12) formed in the deflection plate and defining at least an arcuate path, and projecting means (13, 18) having spaced projecting portions loosely engageable in said groove (12) extending from at least some of the transport plates at spaced positions along said at least one lateral edge for engagement in said groove.
2. The arrangement of claim 1, wherein said spaced projection portions are projecting pins.
3. The arrangement of claim 1, wherein said diversion path (6) extends from the transport path (5) at an essentially right angle.
4. The arrangement of claim 3, wherein said transport belt means comprises two parallel transport belts (4) extending along said transport path (5) and diversion transport belt means (7) extending along said diversion path (6), said belt means comprising friction belts frictionally engaging said transport plates (3);
    and wherein said at least one deflection plate (10) is located above the transport path (5) and the diversion path, said groove is open at the bottom and formed at the bottom surface of the deflection plate (12).
5. The arrangement of claim 1, wherein the groove (12) in the deflection plate (10) is essentially quarter-circular, and extends into essentially straight run-on and run-off regions (E) having a longitudinal extent corresponding at least to the spacing (F) between said spaced projecting portions (13, 18).
6. The arrangement of claim 1, including at least one controllable lifting means (20) coupled to said at least one deflection plate (10) for height-adjustably positioning said at least one deflection plate for selective engagement or non-engagement of said projecting portions (13, 18) in said groove (12).
7. The arrangement of claim 1, further including rollers (18) on said projecting portions (13) loosely fitting in said groove (12).
8. The arrangement of claim 1, wherein said transport plates are formed with two essentially symmetrical edge regions extending in the direction of the transport path (5);
    and wherein said spaced projecting means (13, 18) located on said at least some transport plates (3) are positioned at both said two essentially symmetrical edge regions.
9. The arrangement of claim 8, wherein said spaced projecting means comprise projecting pin elements (13, 18) loosely fitting into said groove (12).

10. Production line arrangement for transporting transport plates (3) adapted for holding workpieces (2) thereon along a first main transport path (5) and a second main transport path, extending essentially parallel to said first transport path, and, selectively, along two diversion paths (6) extending at an angle with respect to said main transport paths, said diversion paths connecting said first and said second main transport paths to form, together with said second main transport path, a bypass;

and comprising transport belt means (4, 7) positioned along both the main transport paths and the diversion paths for frictional engagement with the transport plates, and comprising at least two deflection plates located, respectively, at intersections of said diversion paths (6) and said main transport paths (5, 9); and wherein at least some of the transport plates (3) and the deflecting plate (10) are formed with interengaging, interfitting guide means comprising a first guide means element (12) on the deflection plate (10) and a second guide means element (13, 18) on said at least some of the transport plates, said first guide means element (12) defining an at least in part arcuate path and said second guide means element (13, 18) being loosely, interfittingly coupled to said first guide means element.

11. The arrangement of claim 10, wherein four diversion plates (6) are provided, located at all the intersections of said diversion paths (6) and said transport paths.

12. The arrangement of claim 10, wherein said transport plates define at least one lateral edge extending in the direction of said transport path (5), said first guide means element (12) comprises a groove formed in the deflection plate (10) and said second guide means element comprises two projecting pin means (13, 18) loosely engageable in the groove and guiding the transport plate in an arcuate path upon engagement of the transport plates with the respective belt means in said transport path and said diversion path.

13. Production line arrangement for transporting transport plates (3) adapted for holding workpieces (2) along a transport path (5) and, selectively, along a diversion path (6) extending at an angle with respect to said transport path, having transport belt means (4, 7) positioned along both the transport path and the diversion path for frictional engagement with the transport plates, and comprising at least one deflection plate (10) located at an intersection of the transport path (5) and the diversion path (6), and wherein at least some of the transport plates (3) and the deflection plate (10) are formed with interengaging, interfitting guide means comprising a first guide means element (12) on the deflection plate (10) and a second guide means element (13, 18) on said at least some of the transport plates, said first guide means element (12) defining an at least in part arcuate path and said second guide means element (13, 18) being loosely, interfittingly coupled to said first guide means element; and wherein at least one controllable lifting means (20) is provided, coupled to said at least one deflection plate (10) for selectively positioning the deflection plate with respect to said second guide means element (13, 18) on said at least some of the transport plates (3) for selective engagement, or non-engagement of said interengaging, interfitting guide means.

14. The arrangement of claim 13, wherein said transport plates are formed with two essentially symmetrical edge regions extending in the direction of the transport path (5);

and wherein said second guide means elements are located on said at least some transport plates (3) at both said two essentially symmetrical edge regions.

15. The arrangement of claim 13, wherein said second guide means element comprises projecting pin elements (13, 18), and said first guide means element on the deflection plate (10) comprises a groove (12) into which said pin elements (13, 18) fit loosely.

16. Production line arrangement for transporting transport plates (3) adapted for holding workpieces (2) along a transport path (5) and, selectively, along a diversion path (6) extending at an angle with respect to said transport path, having transport belt means (4, 7) positioned along both the transport path and the diversion path for frictional engagement with the transport plates, and comprising at least one deflection plate (10) located at an intersection of the transport path (5) and the diversion path (6);

wherein said transport plates are formed with two essentially symmetrical edge regions extending in the direction of the transport path (5);

at least some of the transport plates (3) and the deflection plate (10) are formed with interengaging interfitting guide means comprising a first guide means element (12) formed in the deflection plate and a second guide means element (13, 18) on said at least some of the transport plates, said first guide means element defining an at least in part arcuate path and said second guide means element (13, 18) being loosely, interfittingly coupled to said first guide means element for movement in said at least in part arcuate path upon engagement with the transport belt means;

and wherein said second guide means elements (13, 18) are located on at least some of the transport plates (3) at both edge regions of said two essentially symmetrical edge regions.

17. The arrangement of claim 16, wherein said second guide means element (13 18) comprises projecting pin elements (13, 18), and said first guide means element (12) on the deflection plate (10) comprises a groove (12) into which said pin elements (13, 18) fit loosely.

18. The arrangement of claim 17, further including rollers (18) on said projecting pin elements (13) loosely fitting in said groove (12).

19. Production line arrangement for transporting transport plates (3) adapted for holding workpieces (2) along a transport path (5) and, selectively, along a diversion path (6) extending at an angle with respect to said transport path, having transport belt means (4, 7) positioned along both the transport path and the diversion path for frictional engagement with the transport plates, and comprising at least one deflection plate (10) located at an intersection of the transport path (5) and the diversion path (6);

wherein said at least one deflection plate (10) is formed with a groove (12) defining an at least in part arcuate path;

at least some of the transport plates (3) define at least one lateral edge extending in the direction of the transport path, and are formed with a projecting means (13, 18) loosely engageable in said groove (12) of the deflection plate (10) and guiding the transport plate in said arcuate path upon engagement of the transport plates with the respective belt means in said transport path and said diversion path; and wherein said groove (12) in the deflection plate (10) is essentially quarter-circular; and wherein said at least one deflection plate (10) is located above the transport path and the diversion path (6), said groove being formed in a major plan surface of said deflection plate (10) and being open for engagement of said projecting element (13, 18) extending from the transport plates (3) for engagement with said open groove.

20. The arrangement of claim 19, wherein said projecting means comprises pin means (13, 18) loosely fitting into said groove.

21. The arrangement of claim 19, wherein said at least said one deflection plate (10) and said transport plates (3) are positioned in parallel planes and said projecting means (13, 18) extends from said transport plates (3) and projects at essentially right angles to said planes.

* * * * *